(12) United States Patent
Castles et al.

(10) Patent No.: US 9,075,593 B2
(45) Date of Patent: Jul. 7, 2015

(54) MULTIPLE VOLTAGE GENERATOR AND VOLTAGE REGULATION METHODOLOGY FOR POWER DENSE INTEGRATED POWER SYSTEMS

(71) Applicant: DRS Power & Control Technologies, Inc., Milwaukee, WI (US)

(72) Inventors: Gene Castles, Lake Hopatcong, NJ (US); Edgar S. Thaxton, Groton, MA (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 0 days.

(21) Appl. No.: 14/320,307

(22) Filed: Jun. 30, 2014

(65) Prior Publication Data
US 2015/0033048 A1 Jan. 29, 2015

Related U.S. Application Data (63) Continuation of application No. 13/060,205, filed as application No. PCT/US2009/054776 on Aug. 24, 2009, now Pat. No. 8,928,292.

(60) Provisional application No. 61/091,258, filed on Aug. 22, 2008.

(51) Int. Cl.
| | |
|---|---|
| *H02P 11/00* | (2006.01) |
| *H02H 7/06* | (2006.01) |
| *H02P 9/00* | (2006.01) |
| *G06F 1/26* | (2006.01) |
| *B63H 23/24* | (2006.01) |
| *H02P 9/30* | (2006.01) |
| *H02J 4/00* | (2006.01) |
| *H02K 19/34* | (2006.01) |

(52) U.S. Cl.
CPC .............. *G06F 1/263* (2013.01); *B63H 23/24* (2013.01); *H02J 4/00* (2013.01); *H02K 19/34* (2013.01); *H02P 9/307* (2013.01)

(58) Field of Classification Search
USPC ........................................ 322/24, 94; 318/701
See application file for complete search history.

(56) References Cited

U.S. PATENT DOCUMENTS

| | | | |
|---|---|---|---|
| 3,267,353 A | 8/1966 | Franklin | |
| 3,555,395 A | 1/1971 | Beery | |

(Continued)

OTHER PUBLICATIONS

International Search Report for patent application PCT/US09/54776 (Oct. 15, 2009).

(Continued)

*Primary Examiner* — Pedro J Cuevas
(74) *Attorney, Agent, or Firm* — Kilpatrick Townsend & Stockton LLP (57) ABSTRACT

An integrated power system suitable for simultaneously powering marine propulsion and service loads. The system includes: (a) at least one generator configured with at least first and second armature windings configured to output respective first and second alternating current power signals of different voltages, the at least two armature windings positioned within the same stator slots so that they magnetically couple; (b) at least first and second rectifier circuits coupled to said generator to convert said first and second alternating current power signals into first and second direct current power signals; (c) a first load to which said first direct current power signal is coupled and a second load to which said second direct current power signal is coupled.

7 Claims, 3 Drawing Sheets

(56) References Cited

U.S. PATENT DOCUMENTS

| | | | |
|---|---|---|---|
| 3,793,544 A | 2/1974 | Baumgartner et al. | |
| 3,924,789 A | 12/1975 | Avery et al. | |
| 4,045,718 A | 8/1977 | Gray | |
| 4,151,396 A | 4/1979 | Veal | |
| 4,163,187 A | 7/1979 | Thomas | |
| 4,539,515 A | 9/1985 | Morishita et al. | |
| 4,692,684 A | 9/1987 | Schaeffer | |
| 4,788,486 A | 11/1988 | Mashino et al. | |
| 4,933,621 A * | 6/1990 | MacMinn et al. | 318/696 |
| 4,973,896 A | 11/1990 | Shiga et al. | |
| 5,028,804 A * | 7/1991 | Lauw | 290/40 C |
| 5,083,077 A * | 1/1992 | Wallace et al. | 322/32 |
| 5,097,165 A | 3/1992 | Mashino et al. | |
| 5,166,591 A * | 11/1992 | Stephens et al. | 318/701 |
| 5,204,604 A * | 4/1993 | Radum | 318/701 |
| 5,239,251 A * | 8/1993 | Lauw | 318/767 |
| 5,289,107 A * | 2/1994 | Radun et al. | 322/94 |
| 5,381,081 A * | 1/1995 | Radun | 322/94 |
| 5,404,091 A * | 4/1995 | Radun | 322/94 |
| 5,444,355 A | 8/1995 | Kaneyuki et al. | |
| 5,449,962 A | 9/1995 | Shichijyo et al. | |
| 5,506,492 A | 4/1996 | Harris | |
| 5,559,385 A | 9/1996 | Yalovega et al. | |
| 5,607,329 A | 3/1997 | Cho et al. | |
| 5,714,821 A | 2/1998 | Dittman | |
| 5,764,036 A | 6/1998 | Vaidya et al. | |
| 5,841,262 A * | 11/1998 | Tang | 318/701 |
| 5,998,903 A | 12/1999 | Umeda et al. | |
| 6,005,786 A | 12/1999 | Bluemel et al. | |
| 6,150,731 A * | 11/2000 | Rinaldi et al. | 290/1 A |
| 6,150,791 A * | 11/2000 | Fulton | 318/701 |
| 6,175,163 B1 | 1/2001 | Rinaldi et al. | |
| 6,188,139 B1 | 2/2001 | Thaxton et al. | |
| 6,188,204 B1 * | 2/2001 | Vithayathil et al. | 322/29 |
| 6,275,012 B1 | 8/2001 | Jabaji | |
| 6,340,851 B1 * | 1/2002 | Rinaldi et al. | 307/82 |
| 6,373,230 B2 | 4/2002 | Jabaji | |
| 6,448,736 B1 * | 9/2002 | Lajsner et al. | 318/701 |
| 6,541,887 B2 | 4/2003 | Kawamura | |
| 6,555,992 B2 | 4/2003 | Asao et al. | |
| 6,570,289 B1 | 5/2003 | Liang et al. | |
| RE38,464 E | 3/2004 | Kusase et al. | |
| 6,784,583 B2 | 8/2004 | Umeda | |
| 6,788,031 B2 | 9/2004 | Pendell | |
| 6,998,750 B2 | 2/2006 | Anma et al. | |
| 7,030,533 B2 | 4/2006 | Umeda | |
| 7,042,110 B2 | 5/2006 | Mikhail et al. | |
| 7,429,840 B2 * | 9/2008 | Pollock et al. | 318/254.1 |
| 7,439,713 B2 | 10/2008 | Dooley | |
| 7,471,004 B2 | 12/2008 | Kanazawa et al. | |
| 7,554,303 B1 | 6/2009 | Kawamura | |
| 7,576,443 B2 | 8/2009 | Raju | |
| 7,579,812 B2 | 8/2009 | Dooley | |
| 7,622,842 B2 | 11/2009 | Hayashi et al. | |
| 7,863,764 B2 | 1/2011 | Combs et al. | |
| 8,008,828 B2 | 8/2011 | Koike | |
| 8,062,081 B2 | 11/2011 | Barrett et al. | |
| 8,216,008 B2 | 7/2012 | Daffey | |
| 8,244,419 B2 | 8/2012 | Wegner-Dannelly et al. | |
| 8,299,674 B2 | 10/2012 | Tanaka et al. | |
| 8,310,115 B2 | 11/2012 | Elantably et al. | |
| 8,368,276 B2 | 2/2013 | Wolf et al. | |
| 8,476,855 B2 * | 7/2013 | De Filippis | 318/400.35 |
| 8,487,499 B2 | 7/2013 | Tanaka et al. | |
| 8,497,615 B2 | 7/2013 | Kimura et al. | |
| 8,598,765 B2 | 12/2013 | Kashihara | |
| 8,633,629 B2 | 1/2014 | Kashihara | |
| 2001/0040416 A1 | 11/2001 | Nakamura et al. | |
| 2001/0054882 A1 | 12/2001 | Nakamura et al. | |
| 2002/0047448 A1 | 4/2002 | Kawamura | |
| 2002/0093266 A1 | 7/2002 | Buening et al. | |
| 2002/0096963 A1 | 7/2002 | Masegi | |
| 2002/0097027 A1 | 7/2002 | Asao et al. | |
| 2002/0113515 A1 | 8/2002 | Umeda | |
| 2004/0150284 A1 | 8/2004 | Umeda | |
| 2004/0239202 A1 | 12/2004 | Dooley | |
| 2006/0006757 A1 | 1/2006 | Seguchi | |
| 2006/0113967 A1 | 6/2006 | Dooley | |
| 2006/0197396 A1 * | 9/2006 | Pollock et al. | 310/166 |
| 2006/0208594 A1 | 9/2006 | Kashihara et al. | |
| 2006/0220488 A1 | 10/2006 | Koike et al. | |
| 2006/0226721 A1 | 10/2006 | Dooley et al. | |
| 2008/0143182 A1 | 6/2008 | Raju | |
| 2008/0182466 A1 | 7/2008 | Wegner-Donnelly et al. | |
| 2009/0071784 A1 | 3/2009 | Combs et al. | |
| 2009/0072652 A1 | 3/2009 | Koike | |
| 2010/0201298 A1 * | 8/2010 | De Filippis | 318/400.35 |
| 2011/0043069 A1 | 2/2011 | Tanaka et al. | |
| 2012/0194027 A1 * | 8/2012 | Baydasov | 310/197 |
| 2012/0248922 A1 | 10/2012 | Imazawa et al. | |
| 2012/0248924 A1 | 10/2012 | Tanaka et al. | |
| 2013/0300244 A1 | 11/2013 | Kashihara | |
| 2013/0328435 A1 | 12/2013 | Wolf et al. | |
| 2014/0035400 A1 | 2/2014 | Asano | |

OTHER PUBLICATIONS

U.S. Appl. No. 13/060,205, Non Final Office Action mailed on Jul. 18, 2013, 9 pages.

U.S. Appl. No. 13/060,205, Final Office Action mailed on Nov. 13, 2013, 11 pages.

U.S. Appl. No. 13/060,205, Notice of Allowance mailed on Mar. 31, 2014, 11 pages.

* cited by examiner

Figure 3 – Generator Voltage Regulation Schedule (Voltage versus Ship Speed)

MULTIPLE VOLTAGE GENERATOR AND VOLTAGE REGULATION METHODOLOGY FOR POWER DENSE INTEGRATED POWER SYSTEMS

CROSS-REFERENCES TO RELATED APPLICATIONS

The present application is a Continuation of U.S. patent application Ser. No. 13/060,205, filed on Mar. 28, 2011, which is a National Stage of International Application No. PCT/US2009/054776 filed on Aug. 24, 2009, which claims the benefit under 35 U.S.C. §119(e) of U.S. Provisional Patent Application No. 61/091,258, entitled "MULTIPLE VOLTAGE GENERATOR AND VOLTAGE REGULATION METHODOLOGY FOR POWER DENSE INTEGRATED POWER SYSTEMS" filed on Aug. 22, 2008, the entire disclosures of each are incorporated herein by reference for all purposes.

BACKGROUND OF THE INVENTION

The present invention relates to rotating electrical machines that are used as electric power generators in Integrated Power Systems (IPS) where different loads are powered from the same generator. In particular, this invention relates to synchronous machines, both the wound field and the permanent magnet type, used to generate power in systems in which a plurality of voltages are required and constant service load voltage regulation is required. Of particular interest is such an IPS in naval vessels having propulsion system loads and service loads.

A typical generator arrangement in an IPS consists of a wound field synchronous machine or multiple machines that generate Alternating Current (AC) voltage power. This power is distributed to the electric propulsion loads as propulsion power (the voltage of which sometimes is referred to herein as propulsion voltage) and to the services loads as service power (the voltage of which is sometimes referred to herein as service voltage). Because of the typically large power requirements of electric propulsion loads relative to those of the service loads, the propulsion voltage is typically much higher than the service voltage. When this is the case, step-down transformers are typically utilized to lower the generator voltage to the desired service voltage. In addition, transformers are also sometimes included at the front-ends of propulsion motor drives to reduce current harmonics and resultant voltage distortion on the main power distribution bus. As a result, the size, weight, and cost of the IPS are greatly affected and increase with each added component.

For many marine applications, extreme power density is a fundamental requirement, i.e., marine applications require more compact systems with greater power output for a given system size. A typical implementation of a port/starboard integrated power system is illustrated in FIG. 1.

Figure 1:
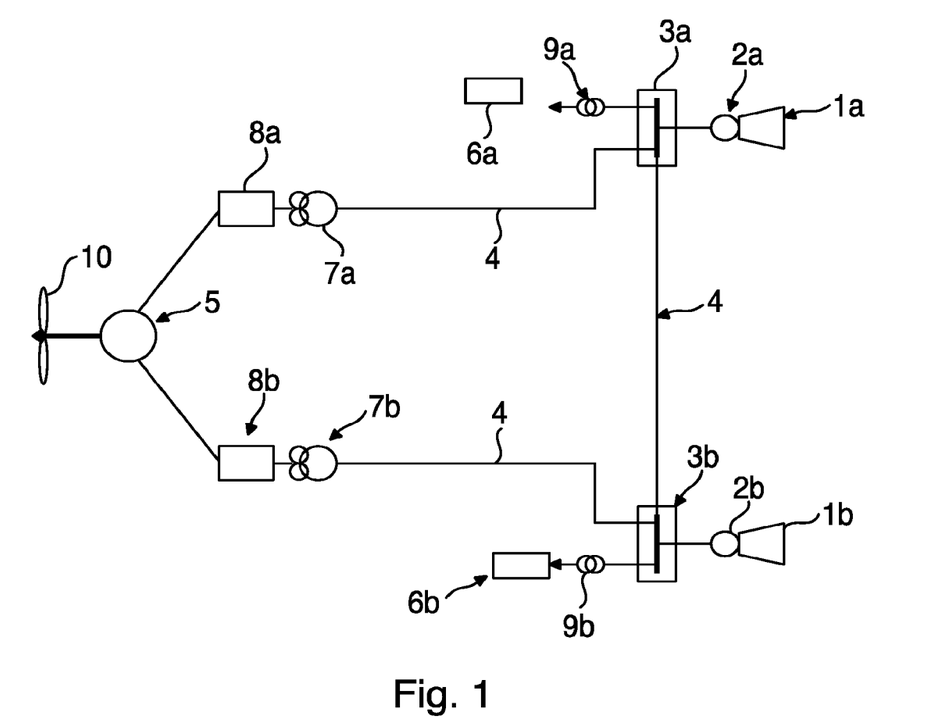
FIG. 1 illustrates in schematic form a typical integrated power system.

As illustrated in FIG. 1, a prime mover 1a provides rotational power to a synchronous generator 2a. Power produced by the generator 2a is typically at a medium voltage, i.e., 5-15 kV, and can be alternating at a standard rate of 50 or 60 Hertz (Hz), or as high as 400 Hz.

The generated power is typically distributed through switchgear 3a and power cabling 4 in a ring configuration to allow connection of other devices such as other generators 2b, propulsion motor 5 and service loads 6a and 6b. Propulsion transformers 7a and 7b are often included to decrease the effect of the propulsion system harmonic currents on the system. The propulsion transformers 7a and 7b feed power at a transformed voltage to propulsion motor drives 8a and 8b, respectively, which in turn are connected to the propulsion motor 5. Motor 5 in turn is operatively coupled to a screw 10. Service load transformers 9a and 9b are typically utilized to reduce the voltage of the generated power to desired service load voltages which can be AC or Direct Current (DC) (if rectified), as typically is done on present Naval combatant platforms. The service load transformers 9 in turn provide power to the service loads 6a and 6b, respectively, at the reduced service load voltages.

Submarine integrated power system architectures have been studied several times. The studies drew conclusions regarding the optimal power distribution system architecture, based on the data and assumptions available at the time of study, foreseen or expected. These data and assumptions included:

a. 1,200-1,700 VDC power semiconductor devices as the only devices capable of providing submarine-level power quality;

b. In early studies, commercial drivers for the development of higher voltage semiconductors were not expected;

c. Single-level basic power structures (H bridges); and d. Conventional electric fault protection devices and conventional coordination systems and methods.

More recent studies have concluded that AC systems are superior to DC systems for the next generation submarine propulsion plant development, superior being measured by a combination of risk, acoustic performance viability and power density. The conclusion was most heavily influenced by the power quality and rating available in the cascaded H-bridge topology (so called "Robicon drive") and the viability of conventional medium voltage vacuum breakers to operate at higher frequencies (120-400 Hz). This conclusion was also supported by the relative ease with which the power system could be scaled to larger platforms.

Subsequent to a majority of these studies, there have been advancements in commercial industry.

Power semiconductors (both IGBTs and IGCTs) are available and are in relatively widespread use at up to 6 kV ratings. 3 kV devices are widely employed in light rail applications, and higher voltage devices are used in rail and in industrial drives, such as mining, metals and petrochemicals.

Multi-level (e.g. neutral point clamped) power structures are widely employed in industrial applications, and high performance military applications, such as the drive for the Permanent Magnet Motor Subsystem (PMMS) successfully tested in the Navy's Philadelphia LBTS facility.

A majority of naval applications rely on power conversion for ship service power, rather than conventional 60 Hz power provided by electric machines. Systems sourced by power conversion equipment have fundamentally different fault current characteristics than systems sourced by rotating electric machines.

U.S. Pat. Nos. 6,504,261 and 6,333,622, incorporated herein in their entireties for all purposes, state that auxiliary windings in synchronous generator/motor machines have been proposed in Naval ship propulsion systems. In particular, the main generator windings would provide power to electric motors coupled to the propeller shaft. The auxiliary windings would provide power to the shipboard power distribution system for lights, motors and other ship functions.

Both of these patents discuss the use of a synchronous generator having main and auxiliary power windings, where the main power windings are coupled to a so-called balanced power system and the auxiliary power windings are selectively coupled to a variable frequency drive system (a so-called static start drive) or to an auxiliary power system (the so-called balance of auxiliary power system). The variable frequency drive system causes the generator to function as a motor and turn a drive shaft to start a gas turbine. Once the turbine is up and running, the generator functions as a generator. The auxiliary power system comprises systems that can be powered by the lower voltage power signal output by the generator when in power generation mode. Switching circuits are used to connect and disconnect the auxiliary windings of the generator between the variable frequency drive system and the auxiliary power system.

BRIEF SUMMARY OF THE INVENTION

The present invention provides a way for generating power at multiple voltages from a single generator to supply power to propulsion and service loads without the need for typical transformers used in prior integrated power systems, thereby significantly increasing the power density of the IPS and reducing its overall cost.

In addition, the present invention provides a way to allow power at variable voltages to be applied to the propulsion loads while maintaining the service loads at a constant voltage.

In an embodiment, the invention provides that propulsion loads and ship service loads are provided with dedicated armature winding sets within a generator with galvanic isolation between them. Each winding set is wound with an appropriate number of turns and current carrying capacity to produce desired voltages and rating for its respective load. The propulsion load winding set and the service load winding set are positioned within the same stator slots to take advantage of mutual magnetic coupling between them.

The voltage produced in a given winding is proportional to the number of turns. Since the propulsion loads are typically fed power at a voltage higher than that of the power fed to the service loads, the propulsion load windings have more turns than the service load windings.

In addition to providing power at multiple voltages from a single generator, the winding sets can employ a relatively high number of individual phases so that conversion from AC voltage to DC voltage with semiconductor rectifying devices results in low harmonic current levels.

The combination of both the multiple voltage and multiple phase features eliminates the need for separate propulsion and service transformers as the transformer functionality provided in the synchronous generator. The invention thus provides for two or more output winding sets (e.g. propulsion load and two ship service load windings, or two propulsion load and two ship service load windings on a single machine).

In an embodiment, the invention provides a propulsion power distribution system using simple vacuum controls, without fault interruption capability.

In an embodiment, the invention provides that generator rectifiers serve both as rectifiers for propulsion load power and service load power and as fault interrupts.

DETAILED DESCRIPTION OF THE INVENTION

Synchronous electrical power generation is well known. Electrical power generators are powered by a prime mover such as a hydrocarbon or nuclear powered turbine. Mechanical energy from the turbine is transferred to a rotor of the generator which in turn rotates to generate the electrical power.

The synchronous electrical power generator includes a centrally rotating rotor surrounded by a stator. The rotor has field coils through which current is driven to create a rotating magnetic field. The rotating magnetic field then affects armature windings in the stator to generate current, and hence power, in the armature windings.

In wound field synchronous machines, typically, the output terminal voltage magnitude can be controlled by increasing the field current of the rotor windings and/or increasing the rotor speed. In typical permanent magnet synchronous machines, the magnetic field strength is fixed such that the generated voltage can only be controlled by rotor speed.

In the present invention, multiple windings in the armature are provided to provide multiple power signals having different voltage levels and separate armature windings are provided for each type of load with the windings operatively configured to deliver power at voltage and current levels appropriate for the respective loads. The winding sets are provided within the same slots in the armature to take advantage of the magnetic coupling between them.

As noted above, the voltage produced in a given armature winding is proportional to the number of turns. Since the propulsion loads are typically fed power at a voltage higher than that of the power fed to the service loads, the propulsion load windings have more turns than the service load windings.

In a dual armature winding, dual voltage generator, the voltage of both stator windings increases proportionally relative to the current directed through the rotor windings, the field current, and/or rotor speed, assuming there is no load on the machine. As higher amounts of load are placed on each of the independent stator windings, the field current or rotor speed needs to be increased to maintain the desired output voltages. An increase in rotor speed results in increased electrical power frequency. This is undesirable on AC loads; however, most state of the art propulsion drives convert the AC power to DC power so that a variable voltage and variable frequency can be applied to the propulsion motor.

In addition, there has been a recent trend, particularly on Naval Combatants, i.e., naval vessels, to distribute DC power in the service load distribution system. As a result, it is beneficial to convert the generated AC power to DC power right at the generator terminal box and distribute DC power to both the propulsion and service loads. This is depicted in FIG. 2.

Figure 2:
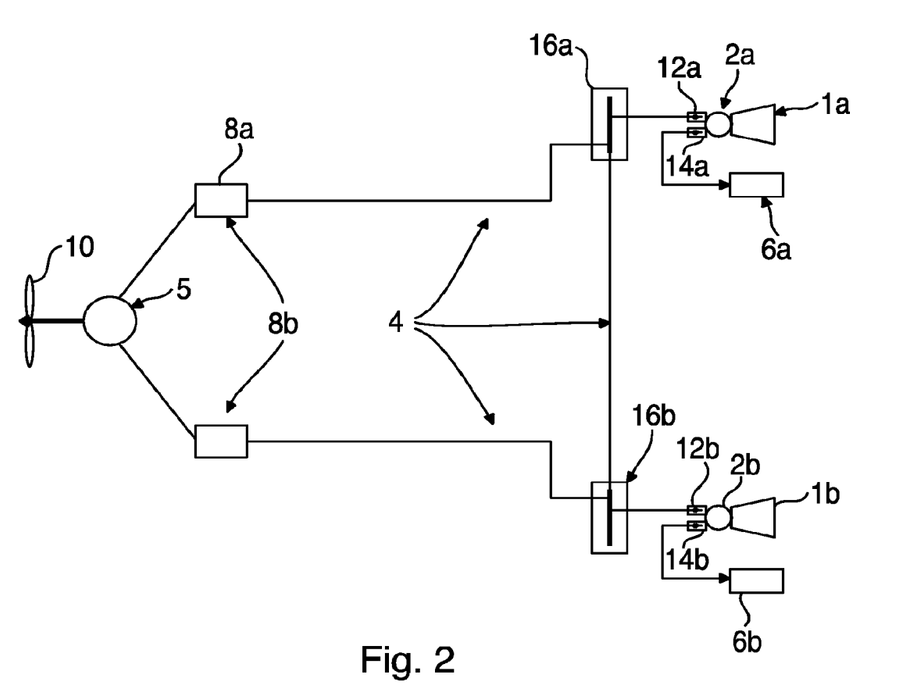
FIG. 2 illustrates in schematic form an integrated power system employing principles of the invention.

In FIG. 2 there is illustrated a dual generator system, although the invention can be implemented using only one generator, or more generators.

As illustrated in FIG. 2, prime movers 1a and 1b provide rotational power to respective synchronous generators 2a and 2b. Two isolated AC power signals having different voltages are produced by the generator 2a and fed to respective AC to DC converters 12a and 14a using controlled or uncontrolled semiconductors. Such converters are well known in the art so a description is not provided here.

Similarly two isolated AC power signals having different voltages are produced by the generator 2b and fed to respective AC to DC converters 12b and 14b of converter, which also use controlled or uncontrolled semiconductors.

The DC power output by the converters 12a and 12b are respectively and independently fed to appropriate special purpose switchgear 16a and 16b described below. Power is routed to propulsion motor drives 8a and 8b through power cabling 4. The propulsion motor drives 8a and 8b then feed power to the propulsion motor 5 to provide propulsion to the vessel via screw 10.

Power semiconductors have reached much higher ratings (6 kV IGBTs and IGCTs), and new power topologies (neutral point clamped (NPC), hybrid drive topology) allow drive voltages above the basic semiconductor ratings. Combining these features offer much higher propulsion drive operating voltages than have been considered in past studies, and eliminate the need for a transformer between the drivers a and b and their generators 2a and 2b, respectively.

The generation and distribution of DC voltage enables a feature of the invention in that the voltage fed to the propulsion load can be varied proportional to desired ship speed while the service load voltage is held constant. Varying the propulsion load voltage proportionally with the desired ship speed is beneficial because the propulsion drive semi-conductors are better utilized when the DC input voltage is closely matched to the required motor voltage magnitude for a given speed.

There are three components that can regulate the propulsion and ship service voltages: 1) the generator field(s), 2) the propulsion controlled rectifier 12 a, (12b) and 3) the ship service controlled rectifier (14a and 14b).

The methodology used to vary the propulsion power voltage while maintaining a constant service power voltage is as follows:

1. From 50% to 100% of full propulsion (or ship) speed, the propulsion power DC voltage is proportionally varied from 50 to 100% of nominal full voltage by use of field control and/or rotor speed variance, i.e. by varying the amount or rotor winding current and/or rotor speed. At 50% propulsion speed (and consequently, 50% propulsion DC voltage), the service voltage is 100% of its nominal rating. At 100% propulsion speed (and consequently, 100% propulsion DC voltage), the service voltage is 200% of its nominal rating. During the 51-100% propulsion speed/DC voltage range a constant service voltage is maintained by control of the rectification semiconductors (e.g. phase controlling the rectifiers).

2. At propulsion speeds below 50%, the field and/or rotor speed is held constant and the propulsion rectification semiconductors are utilized to further reduce the propulsion load voltage to the desired level.

3. At propulsion speeds below 50%, the ship service voltage is 100% of nominal since the field and/or rotor speed is regulated to the 50% propulsion voltage (see paragraph 2 above).

In accordance with the principles of the invention, voltage regulator sensing need be provided on the propulsion load winding set only. However, the service winding voltage is maintained for most all combinations of extreme load variations of the two windings. This is true because the propulsion load winding set is dominant and highly magnetically coupled to the service load winding set due to the fact that individual winding phases are located in the same stator slots. As a result, as load is placed on the propulsion load winding and the field and/or rotor speed is increased to maintain voltage, the armature reaction or flux weakening associated with the load current in the propulsion load winding reduces the influence of the increased flux from the field and/or rotor speed increase as load is applied. The armature reaction keeps the service load voltage near nominal for all but the most extreme condition where the propulsion load windings are fully loaded and there is no load on the service load windings. Even under these extreme conditions, the service load voltage is expected to be within 12% of nominal without any additional semi-conductor regulation. Since the service load voltage is normally being regulated down by its rectification semi-conductors when the propulsion load/voltage is 51-100%, any additional voltage produced under these circumstances can be easily handled and regulated by the service rectification semi-conductors.

Figure 3:
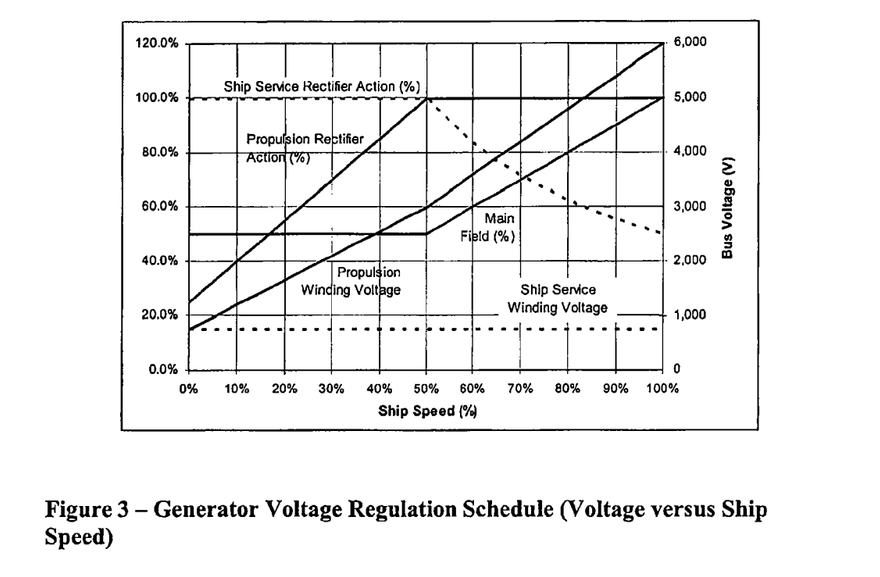
FIG. 3 illustrates in graph form a relationship between generator voltage regulations and propulsions load/ship speed in a system embodying principles of the invention.

The relationship between generator voltage regulate and propulsion load (in terms of ship speed) is illustrated in Table I and FIG. 3.

The "harmonic flux" is an indicator of the flux variation due to phase controlled rectifier harmonics. These specific harmonics will vary in magnitude and frequency over the operating range. The objective of this indicator is to show that at low ship speed these harmonics are relatively low over the operating range. This is because the rectifier phase control is performed on the propulsion load, which is very small at low ship speed. As the propulsion load increases, the phase control shifts to the lower power, ship service winding. Thus, the total harmonics in the air-gap flux as a percentage of the generator rating are relative low at all operating conditions.

Another benefit of reducing the field strength on the generator at low speeds is a reduction in the electromagnetic forces generated. Electromagnetic pressure varies as the square of the airgap flux density and the primary bending mode pole passing pressure, for example, will be reduced by a factor of four (4) at 50% field strength or 50% speed and below.

An important issue to consider is the propulsion fault protection and coordination. In accordance with principles of the invention, faults can be identified and located when they occur, and the fault can be protected by interrupting the source of fault current closest to the source (in this case using the controlled rectifiers). Following interruption, the contactor closest to the fault can be opened to isolate the fault. Then power can be reapplied via the controlled rectifiers again. This reduces the peak fault currents and fault energy significantly. It also provides better power continuity than conventional time-over current methods.

TABLE 1

| Generator Voltage Regulation Schedule (Voltage versus Ship Speed) | | | | | | | | |
|---|---|---|---|---|---|---|---|---|
| Ship Speed (%) | Propulsion Load (%) | Ship Service Load (%) | Field OC Regulation (%) | Main Rectifier Action (% Phase) | Ship Service Rectifier (% Phase) | Main Winding (V) | Ship Service Winding (V) | Harmonic Flux (%) |
| 0% | 0.0% | 50.0% | 50.0% | 25% | 100% | 750 | 750 | 0.00% |
| 5% | 0.0% | 50.0% | 50.0% | 33% | 100% | 975 | 750 | 0.01% |
| 10% | 0.1% | 50.0% | 50.0% | 40% | 100% | 1,200 | 750 | 0.05% |
| 15% | 0.3% | 50.0% | 50.0% | 48% | 100% | 1,425 | 750 | 0.15% |
| 20% | 0.8% | 50.0% | 50.0% | 55% | 100% | 1,650 | 750 | 0.30% |

TABLE 1-continued

Generator Voltage Regulation Schedule (Voltage versus Ship Speed)

| Ship Speed (%) | Propulsion Load (%) | Ship Service Load (%) | Field OC Regulation (%) | Main Rectifier Action (% Phase) | Ship Service Rectifier (% Phase) | Main Winding (V) | Ship Service Winding (V) | Harmonic Flux (%) |
|---|---|---|---|---|---|---|---|---|
| 25% | 1.6% | 50.0% | 50.0% | 63% | 100% | 1,875 | 750 | 0.49% |
| 30% | 2.7% | 50.0% | 50.0% | 70% | 100% | 2,100 | 750 | 0.68% |
| 35% | 4.3% | 50.0% | 50.0% | 78% | 100% | 2,325 | 750 | 0.80% |
| 40% | 6.4% | 50.0% | 50.0% | 85% | 100% | 2,550 | 750 | 0.80% |
| 45% | 9.1% | 50.0% | 50.0% | 93% | 100% | 2,775 | 750 | 0.57% |
| 50% | 12.5% | 50.0% | 50.0% | 100% | 100% | 3,000 | 750 | 0.00% |
| 55% | 16.6% | 50.0% | 55.0% | 100% | 91% | 3,300 | 750 | 0.76% |
| 60% | 21.6% | 50.0% | 60.0% | 100% | 83% | 3,600 | 750 | 1.39% |
| 65% | 27.5% | 50.0% | 65.0% | 100% | 77% | 3,900 | 750 | 1.92% |
| 70% | 34.3% | 50.0% | 70.0% | 100% | 71% | 4,200 | 750 | 2.38% |
| 75% | 42.2% | 50.0% | 75.0% | 100% | 67% | 4,500 | 750 | 2.78% |
| 80% | 51.2% | 50.0% | 80.0% | 100% | 63% | 4,800 | 750 | 3.13% |
| 85% | 61.4% | 50.0% | 85.0% | 100% | 59% | 5,100 | 750 | 3.43% |
| 90% | 72.9% | 50.0% | 90.0% | 100% | 56% | 5,400 | 750 | 3.70% |
| 95% | 85.7% | 50.0% | 95.0% | 100% | 53% | 5,700 | 750 | 3.95% |
| 100% | 100.0% | 50.0% | 100.0% | 100% | 50% | 6,000 | 750 | 4.17% |

At startup and on fault recovery the propulsion rectifier will limit inrush to the propulsion drives 8a and 8b. This eliminates the need for additional hardware in the propulsion drive, and is consistent with the rectifier functionally being in the generator propulsion rectifier. The paradigm is that the propulsion rectifier 12a will always limit overcurrent to the propulsion system. If necessary, inrush limiting can be added to the propulsion drive with only a very small impact on size and weight.

An Emergency Propulsion Motor (EPM) function can be provided by an interlocked breaker from the ship service distribution system to the propulsion distribution system. One of the main propulsion drives can then provide propulsion via the motor.

Another difference from prior systems is parallel operation of the generators on the main/propulsion bus. Operationally, the propulsion motor can be supplied by one of four drives. To lose significant main propulsion capability, one generator and the opposite two drives must be out of service. In addition, the EPM function in this system is limited only by the maximum ship service voltage relative to the propulsion motor BEMF and the source of power (ship service rectifier or battery converters). Much higher ship speed can be achieved on ship via this systems' EPM function. On the ship service side a cross-connect is available. If parallel operation is required, it can be accommodated in the presently disclosed system. An additional contactor can be added and paralleling controls added to the propulsion rectifiers. Since the propulsion system provides a single motor, there is no ambiguity in the variable voltage of the system in parallel operation.

A generator with dual windings is not a completely new concept. This was previously studied in submarine architecture evaluations, but discarded due to concerns in regulating two voltages with one rotor field. This concern was exaggerated at the time because the effect of the generator armature reaction was not fully understood.

Subsequently, it has been determined that a dual winding generator behaves exactly like a single winding generator with a transformer, within the bounds of the electromagnetic characteristics of the generator and transformer (leakage, turns ratio, etc.). A comparison of two generator designs D12 and D37 designed to accommodate a second winding set is provided in Table 2.

The size of the generator to accommodate the secondary winding increases very slightly over the baseline in absorbing the transformer function. The weight increases approximately 9% with the air-cooled stator and 5% with the water-cooled stator options respectively. The weight comes principally from slightly deeper stator slots to accommodate the additional winding. It should be noted that the total generator copper is roughly the same. The additional space is required for insulation and slot fill inefficiencies from two windings versus one.

TABLE 2

Generator Parameters: Baseline (single winding) and DC (dual winding) Architectures

| Task | D12 | D37 | DC Dual Winding Air Cooled | | DC Dual Winding Water Cooled | |
|---|---|---|---|---|---|---|
| | | | Primary | Secondary | Primary | Secondary |
| Power (xVA) | 6.3x | 6.3x | 4.725x | 1.575x | 4.725x | 1.575x |
| Speed (RPM) | 4,550 | 4,550 | 4,550 | | 4,550 | |
| Poles | 6 | 6 | 6 | | 6 | |
| Frequency (Hz) | 227.5 | 227.5 | 227.5 | | 227.5 | |
| Voltage (vac RMS) | 6,900 | 6,900 | 4,500 | 1,100 | 4,500 | 1,100 |
| Winding Type | 3-φ | 3-φ | 4x3-φ | 4x3-φ | 4x3-φ | 4x3-φ |
| Stator Cooling | Water | Air | Air | Air | Water | Water |
| Rotor Cooling | Air | Air | Air | Air | Air | Air |

TABLE 2-continued

Generator Parameters: Baseline (single winding) and DC (dual winding) Architectures

| Task | D12 | D37 | DC Dual Winding Air Cooled | | DC Dual Winding Water Cooled | |
|---|---|---|---|---|---|---|
| | | | Primary | Secondary | Primary | Secondary |
| Size: | | | | | | |
| Length (in) | 150.1 | 150.1 | 150.1 | | 150.1 | |
| Height (in) | 102.0 | 108.0 | 112.0 | | 105.0 | |
| Width (in) | 76.0 | 80.0 | 84.0 | | 78.5 | |
| Bearing Span (in) | 87.2 | 87.2 | 87.2 | | 87.2 | |
| Weight (lbs) | 59,100 | 65,100 | 71,091 | | 61,981 | |

The generator includes integral controlled rectifiers, one for propulsion and one for ship service. These are simple silicon-controlled rectifiers.

TABLE 3

Generator Rectifiers: Serving Ship Service and Propulsion

| | Ship Service | Propulsion |
|---|---|---|
| Rating | 4.725xVA | 1.575xVA |
| Input Voltage | 550-1,100 vac | 2,250-4,500 vac |
| Output Voltage | 750 vdc | 750-6,000 vdc |
| Volume | 32 cu-ft | 375 cu-ft |
| Weight | 1,850 lbs | 6,900 lbs |

To facilitate using the controlled rectifiers as fault protection devices, the rectifiers can be physically integrated with the generator. By eliminating unprotected cable from the generator to the switchboards, this relieves the need for a separate circuit breaker in the generator terminal box.

Dual Winding Generator Voltage Regulation

In a conventional, single stator winding generator the voltage drop versus load is given by:

$$V_{terminal} = V_{no\ load} - V_{armature} - (V_{resistance} + V_{leakage}) \quad (1)$$

Where:

$$V_{resistance} = R_{winding} * i_{winding} \quad (2)$$

$$V_{leakage} = L_{leakage} * di_{winding}/dt = L_{leakage} * i_{winding} * \omega \quad (3)$$

$$V_{armature} = L_{armature} * di_{winding}/dt = L_{armature} * i_{winding} * \omega \quad (4)$$

$$V_{no\ load} = k * i_{field} * \omega \quad (5)$$

It is important to note that the effect of $V_{armature}$ is to change (generally lower) the magnetic flux of the main field which is cutting through the stator. If another winding (Winding b) is placed into the same slots of the generator and has the same number of turns, the voltage on that winding will follow Equation (5):

$$V_{terminal\ b} = V_{no\ load} - V_{armature\ a} \quad (5)$$

The reason for this is that the two windings are very highly coupled. What happens on one winding directly affects the other winding proportional to the turns ratio of the two windings.

If we consider current loading on Winding b and a different turns ratio between Winding a and Winding b (with corresponding different no load voltages), we get the following:

$$V_{terminal\ b} = V_{no\ load\ b} - n_b/n_a * V_{armature\ a} - [V_{armature\ b} - (V_{resistance\ b} + V_{leakage\ b})] \quad (6)$$

And looking at the effect of the loading in Winding b on Winding a we see:

$$V_{terminal\ a} = V_{no\ load\ a} - n_a/n_b * V_{armature\ b} - [V_{armature\ a} - (V_{resistance\ a} + V_{leakage\ a})] \quad (7)$$

A similar analysis can be made in terms of machine flux rather than voltage drop.

The generator voltage regulator changes the no-load voltage by changing the field current to correct terminal voltage disturbances due to the armature, resistance and leakage effects. The armature reaction is by far the largest effect, generally an order of magnitude more than both the resistance and leakage effects. Therefore, if the armature effects are combined and seen on both windings and the armature effect is dominant, regulating one terminal will provide regulation of the other. This works because the disturbances seen on one terminal are seen equally on both in a per unit basis.

This behavior is identical to that of a generator (e.g. 4,160 v) with a separate transformer (4,160 v to 480 v). Similarly, disturbances on both buses are seen at the generator terminals. In this manner a 4,160 v generator with a 4,160 v to 480 v transformer can support both 4,160 v and 480 v loading, while regulating only the 4,160 v terminals with only a minor variation in both bus voltages.

Switchgear useable as the switchgear 16a and 16b includes compact vacuum contactors that are utilized for the sole purpose or providing galvanic isolation between the generators and the propulsion motor drives. Fault detection and isolation is provided at the generator terminal box through the use of current sensors and phase controlled rectifiers. Since the rectifiers will be used to stop the flow of current, the isolation contactors can be compact since they never interrupt current. The contactors need only be rated to handle the continuous current and withstand peak fault current.

An example of a contactor that could be used for this purpose is a Joslyn Clark™ special purpose contactor for galvanic isolation with ratings of 3,000 A single phase, 1,200 A three phase. This switch includes 6 vacuum interrupters. Two interrupters are configured in parallel to provide 1,200 A of current carrying capability. If more current carrying capability is required, all six contactors can be placed in parallel to provide a 3,000 A ampacity. For the propulsion drive application, it is envisioned that one set of six contactors would be utilized to isolate both the plus and minus legs of the power feeder. Three of the contactors would be utilized for the DC positive polarity and three for the negative polarity in an alternating fashion so that cable pluses are kept in close proximity to the cable minuses.

Table 4 provides a comparison of system switchgear for a system embodying principles of the invention relative to baseline MV MF AC switchgear in terms of size, volume and weight. The baseline MY MF AC switchgear contains commercial vacuum interrupter circuit breakers that have been ruggedized U.S. for Navy applications and derated for the increased power frequency of the baseline system. It should also be noted that the inventive system switchgear has lower losses than the baseline switchgear. This is due to the skin effect on the current carrying conductors and contacts within the baseline switchgear due to the AC power frequency. This causes the effective resistance of the conductors and contacts to go up which increases conduction losses. In test, these losses are significant enough to require the circuit breakers to be derated by 50 to 60%. The DC switchgear of the present system will not have the additional skin effect losses thus only the conduction losses due to the DC resistance will be present.

TABLE 4

Comparison of Switchgear Weight to Baseline

| | Size | | | volume | Weight |
|---|---|---|---|---|---|
| | Width (in) | Depth (in) | Height (in) | (ft$^3$) | (lbs) |
| Baseline Switchgear | 112 | 64 | 81 | 336 | 4,900 |
| DC Switchgear | 36 | 36 | 72 | 54 | 1,750 |
| DC Relative to Baseline | −76 | −28 | −9 | −282 | −3,150 |

Comparison to Baseline

In the end, a main consideration is resultant power system density. A baseline system using equipment as identical as possible is made to illustrate the differences between that system and a system embodying principles of the inventions. In both cases Curtiss-Wright generator designs matching DRS turbine designs are used. In both cases DRS propulsion drives and switchgear are used. The comparison will be slightly different (likely more dramatic) if a cascaded H-bridge propulsion drive is used for the baseline system to compare with.

Size and Weight

Table 5 shows the weight and volume comparison for the two architectures. The inventive system provides over 90,000 lbs weight savings and over 1,300 cubic feet component (not arranged space) volume savings. It is important to note that this comparison is between two system using a Hybrid Propulsion Drive. The size and weight differences will be larger if a Cascaded H-Bride Propulsion Drive is used in the baseline systems.

TABLE 5

System Weight and Volume Summary and Comparison

| | Generator [1] | Switchgear | Ship Service Converter [2] | Propulsion Drive [3] | Total |
|---|---|---|---|---|---|
| Weight (lbs) | | | | | |
| Baseline | 132,200 | 9,800 | 27,432 | 142,304 | 311,736 |
| DC Alt. | 142,182 | 3,500 | 17,500 | 57,120 | 220,302 |
| Delta | 9,982 | −6,300 | −9,932 | −85,184 | −91,434 |
| Volume (cu-ft) | | | | | |
| Baseline | 673 | 480 | 140 | 2,652 | 3,945 |
| DC Alt. | 817 | 54 | 407 | 1,363 | 2,641 |
| Delta | 144 | −426 | 267 | −1,289 | −1,304 |

[1] For the air-cooled generator option, and includes the generator output breaker.
[2] Represents the generator rectifiers (propulsion and ship service) for the system of the present invention.
[3] A hybrid drive is the basis of comparison. If the baseline is a cascaded H-Bridge the difference will be larger.

Efficiency

Table 6 summarizes the full-load propulsion and ship service efficiencies for the baseline system and a system embodying principles of the invention. The efficiency differences for the DC Alternative system can largely be attributed to the removal of the propulsion and ship service transformers. The propulsion rectifier losses go from the propulsion drive to the generator. The switchgear losses are lower due to conducting only DC currents (resistive losses) in the switchgear and cabling, versus the relatively high (for switchgear and cabling) AC losses in the baseline system, for example, the derating factors are approximately 70%, which represents twice the losses).

In summary, the full load efficiency of the inventive system is between 1-2% better for propulsion and ship service power. This is from approximately 18% and 33% reduction in losses for propulsion and ship service respectively. This full-load efficiency benefit has a direct correlation to the required rating of all upstream equipment (e.g. turbine, condenser and steam generators). There will be a related improvement in efficiency across the operating range of the propulsion plant. The overall efficiency improvement will improve the EFPH per operating hour of the ship and reactor life relative to the baseline systems.

TABLE 6

Efficiency Summary and Comparison

| Efficiency (%) | Generator[1] | Switchgear[3] | Ship Service Converter[2] | Propulsion Drive | Propulsion Total | Ship Service Total |
|---|---|---|---|---|---|---|
| Baseline | 97.50% | 98.75% | 98.51% | 95.85% | 92.28% | 94.84% |
| DC Alt. | 96.53% | 99.50% | 100.00% | 97.50% | 93.64% | 96.53% |
| Delta | −0.98% | 0.75% | 1.50% | 1.65% | 1.36% | 1.68% |
| | | | % Loss Improvement | | 17.58% | 32.63% |

[1]For the air-cooled generator option. Includes rectifier efficiency for the DC Alt.
[2]Rectifier efficiency is in the generator efficiency estimate.
[3]Includes cabling.

It can be seen that in addition to significant power density increases, the present invention provides other benefits:

The rectifier serves the generator both as breaker and rectifier.

The ship service converter is integrated into MV switchboard, thus providing ship service fault interruption function.

The rectifiers provide fault interruption.

The contactors provides isolation.

The ship service transformer function is integrated into the generator windings (two fully-isolated windings).

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An integrated power system comprising:
   at least one power generator including:
      a stator including a plurality of armature windings, wherein the plurality of armature windings includes at least:
         a first set of armature windings; and
         a second set of armature windings,
         wherein each set of armature windings is electrically isolated from each other set of windings,
         wherein each set of armature windings generates an alternating current (AC) power signal of a different voltage than each other set of windings, and
         wherein each set of armature windings are positioned in the stator to have mutual magnetic coupling therebetween.

2. The integrated power system of claim 1 wherein the at least one power generator further comprises:
   at least a first and a second rectifier circuit,
   wherein the first rectifier circuit converts the AC power signal from the first set of armature windings into a first direct current (DC) power signal, and
   wherein the second rectifier circuit converts the AC power signal from the second set of armature windings into a second DC power signal.

3. The system of claim 1 further comprising:
   multiple rectifier circuits physically integrated into the one or more power generators, each rectifier circuit configured to receive a respective one of the AC power signals and to convert it into a direct current (DC) power signal for powering a corresponding electrical load.

4. The integrated power system of claim 2 further comprising:
   a first electrical load coupled to an output of the first rectifier circuit; and
   a second electrical load coupled to an output of the second rectifier circuit,
   wherein the first and second DC power signals are provided from the single power generator directly without using transformers coupled between the generator and the first and second electrical loads.

5. The integrated power system of claim 1 further including a rotor, wherein a magnitude of voltage levels of the first and second AC power signals is controlled by at least one of increasing a field current in the rotor or by increasing a rotational speed of the rotor.

6. The integrated power system of claim 4 wherein the first and second electrical loads include a propulsion load and a service load.

7. The integrated power system of claim 6 wherein variable voltage levels are applied to the propulsion load while maintaining the service load at a constant voltage level.

* * * * *